United States Patent [19]

Wolcott, Jr. et al.

[11] 3,954,691

[45] May 4, 1976

[54] GLASS ENAMEL MEDIUM

[75] Inventors: Norman G. Wolcott, Jr., Mentor; Jerome D. Thomas, Eastlake, both of Ohio

[73] Assignee: The Harshaw Chemical Company, Cleveland, Ohio

[22] Filed: Jan. 29, 1975

[21] Appl. No.: 544,990

[52] U.S. Cl. .................. 260/33.2 R; 260/33.4 R; 260/33.4 PQ; 260/897 R; 260/42; 260/45.7 R
[51] Int. Cl.² .................. C08K 5/05; C08K 5/06; C08L 23/06
[58] Field of Search ..... 260/897 R, 33.2 R, 33.4 PQ

[56] References Cited
UNITED STATES PATENTS

| | | | |
|---|---|---|---|
| 2,617,740 | 11/1952 | Morris | 106/49 |
| 3,222,314 | 12/1965 | Wolinski | 260/33.2 R |
| 3,338,778 | 8/1967 | Hutchins et al. | 260/33.2 R |
| 3,582,384 | 6/1971 | Belde et al. | 106/288 Q |

OTHER PUBLICATIONS

Kirk-Othmer — Encyclopedia of Chem. Techn. (2nd Ed.) (Vol. 10) (Interscience) (N.Y.) (1966), pp. 655 & 657.

Modern Plastics Encyclopedia 1968, (McGraw-Hill) (N.Y.) (Sept. 1967), pp. 209–210.

*Primary Examiner*—Donald E. Czaja
*Assistant Examiner*—H. H. Fletcher

[57] ABSTRACT

A novel medium for a glass enamel consists essentially of at least 50, preferably at least 80, weight percent polyether glycols, solid at room temperature, having a weight average molecular weight in the range of 2000 to 9000, the remainder of the medium being incompatible vinyl-type polymers, solid at room temperature, having a viscosity at 140° C. less than 1000 cps., preferably less than 500 cps. This medium is used in a minor amount with extenders, together with pigments, stabilizers, leveling agents and other additives, as desired, to make novel glass enamels useful for non-smearing patterns on glass which is to be subsequently coated with hot resins. However, this medium is equally useful in vitrifiable systems.

9 Claims, No Drawings

GLASS ENAMEL MEDIUM

BACKGROUND OF THE INVENTION

In previous well-known glass enamel systems decorating material consisted essentially of 1 to 2 micron particle size vitrifiable compositions or glazes, i. e. ceramic colors, suspended in a medium which represented 15 to 25 percent by weight of the total decorating material. This material was applied to glass which was then heated to 550° to 650° C. to remove the medium and to fuse the vitrifiable compositions to the glass giving a glossy, chemically resistant decoration.

The development of the disposable or so-called non-returnable bottle, used for merchandising soft drinks and malt-based beverages, has stimulated the development of a resin coating system designed to protect the bottle from abrasion and to reduce shattering of glass in the case of bottle breakage. The resin is preferably applied to a bottle by heating the bottle to 320° to 330° F. (160° to 166° C.), applying a finely divided ionomer resin powder by an electrostatic method and curing the resin at 420° to 440° F. (216° to 227° C.). For such disposable bottles fused decorations are a needless expense. Therefore, a new decorating material for glass is now desired which is capable of giving a multicolor decoration acceptable in appearance, which will not react with or permeate the resin coating, which will not smear if the cured resin coating slips across the decorated glass surface and which withstands the heating cycles of the resin cure and subsequent bottle sterilization with no loss of decoration color or detail.

New decorating systems have been tried with mediums based on fatty alcohols, fatty acids, polyolefins or polyethylene glycols, the significant feature in each case being that the components of each medium are mutually compatible. The glycol-based decorating materials appeared to be the best of the systems but still only fair in that they had such disadvantages as turning yellow during the resin cure, separating slightly during any heat treatment, tending to absorb moisture under some conditions, and making the cured resin sticky rather than hard and dry.

Patent references of interest with regard to such mediums and decorating systems are U.S. Pat. Nos. 2,617,740; 2,823,138; 3,582,384; and 3,808,019.

The principal object of this invention is to provide a new medium for a new decorating material for glass surfaces having the above described characteristics without the described disadvantages.

SUMMARY OF THE INVENTION

This invention comprises a novel medium for glass enamel, said medium consisting essentially of from about 50 to about 97, preferably at least 80, weight percent polyether glycols having a weight average molecular weight in the range of 2000 to 9000, preferably 3000 to 6000, the remainder of said medium being polyvinyl polymers, solid at room temperature, incompatible with said glycols in a liquid state and having a viscosity at 140° C. less than 1000 cps., preferably less than 500 cps.

This invention also comprises a decorating material for and its application to glass surfaces, said material consisting essentially of 20 to 50 weight percent of the above described medium, the remainder being essentially extenders and pigments, there being no more than about 10 weight percent organic pigments, if any.

DESCRIPTION OF PREFERRED EMBODIMENTS

The novel medium of the decorating materials of this invention is principally a mixture of two components.

The first component is made up of polyether glycols, preferably polyethylene glycols, which are solid at room temperature and consequently have weight average molecular weights ranging from about 1000 to 20,000 or more. The commonest suitable glycols which are commercially available are glycols having weight average molecular weights of 1000, 1540, 4000, 6000, and 20,000, but this invention is not intended to be limited to the use of these glycols only. It appears that the glycol component as a whole must have a weight average molecular weight in the range of 2000 to 9000, preferably 3000 to 6000, and a blend of a broad spectrum of glycols is more desirable than a single glycol fraction such as 4000 molecular weight polyethylene glycol alone.

The other principal component of the medium is one or more polyvinyl-type polymers which are solid at room temperature, i. e., 20° C., which are incompatible with the glycols of the first component when both are in a liquid state and which have a viscosity at 140° C. less than 1000 cps., preferably less than 500 cps. Such resins are preferably free of aliphatic unsaturation. While these polymers can be such varied materials as polystyrenes, polyacrylates, polymethacrylates, polyacrylonitriles, polyvinyl ethers, polypropylenes, polyvinyl acetates and corresponding copolymers, the preferred polyvinyl-type polymers are polyethylenes, preferably those generally referred to as "low molecular weight." Both emulsifiable and non-emulsifiable polyethylenes are suitable. It appears that such suitable polyethylenes must have viscosities at 140° C. less than 1000 cps., preferably less than 500 cps.

The glycol and polyvinyl components must be heated to a liquid state in order to mix them. While they are incompatible and consequently tend to separate when mixing stops, the presence of an extender appears to reduce substantially this tendency. In blending the glycol and polyvinyl components, a medium containing over 30 weight percent of a suitable polyethylene has been mixed successfully with a suitable glycol by reducing the amount of extender present, but it is preferable to use no more than about 13 weight percent of the polyvinyl component in the medium. At least about 2, preferably at least 5, weight percent of the polyvinyl component must be present for the purposes of this invention. This means that the glycol component forms at least about 50, preferably at least about 80, more preferably at least about 87 weight percent of said medium and no more than about 97, preferably no more than 95, weight percent of said medium.

It is necessary as a practical matter to include in the medium of this invention at least 0.5 weight percent of a standard organic antioxidant to contribute to heat stability and to assure a rigid non-sticky final coating. As a practical matter no more than about 10 weight percent is used.

The novel mediums of this invention are used in the preparation of glass decorating materials by mixing them with solid inorganic extenders, optionally with inorganic pigments, including, for example, lithopone, blanc fixe, crushed marble, titanium dioxide, cadmium oxide, iron oxide, carbon black, and more complicated compositions as illustrated in U.S. Pat. No. 3,022,186. If the desired color cannot be achieved with the inorganic extenders and pigment alone, organic pigments or dyes such as those of the azo, dioxazine, phthalocyanine, quinacridone, anthraquinone, and naphthylene- and perylene-tetracarboxylic acid series can be included. In such decorating materials the medium is present in the range of 20 to 50 weight percent of the total material, any organic pigments or dyes are present in an amount of no more than about 10 weight percent, and the remainder consists essentially of inorganic extenders, inorganic pigments and small amounts of any additives such as the antioxidants mentioned above. The solid extenders and pigments have average particle sizes no more than about 2 microns, preferably no more than about 1 micron.

The following example is a typical formulation prepared according to a typical procedure. All quantitative amounts are by weight unless otherwise stated. This example is intended to illustrate the best presently known embodiment of this invention but not to limit this invention.

EXAMPLE

A typical glycol formulation which has been found to be very satisfactory consists of 4 percent of 20,000 average molecular weight polyethylene glycol, 86 percent of 4000 average molecular weight polyethylene glycol, 7 percent of 2000 average molecular weight polyethylene glycol, 1 percent of a commercial acetylenic glycol leveling agent and 2 percent of a commercial organic antioxidant for paint formulations, such as a commercial alkylidene bisphenol.

The above glycol component was used as a part of a medium in the preparation of a white decorating material with the following formulation.

| | |
|---|---|
| 60 percent | lithopone |
| 35 percent | glycol component |
| 5 percent | commercial non-emulsifiable polyethylene solid at room temperature and having an average viscosity at 140° C. of 200 cps. |

To make a red decorating material, the lithopone was replaced by a mixture of 93 percent blanc fixe, 1.2 percent titania and 5.8 percent of azo organic pigments known commonly as BON reds and their derivatives.

To make a green decorating material, the following formulation was used:

| | |
|---|---|
| 45.8 percent | blanc fixe |
| 19.6 percent | inorganic yellow pigment |
| 0.9 percent | phthalocyanine green pigment |
| 32.7 percent | glycol component |
| 2.0 percent | polyethylene component |

A typical procedure for preparation of the medium and then the decorating material is as follows:

1. Heat the polyethylene or other corresponding polyvinyl material at least to its softening point and preferably above its softening point. For the polyethylene used in this example, the softening point is about 105° C., and the polyethylene was heated to about 120° C.

2. Heat the glycols to above their mutual softening point, viz., to 90° C. in this example, and add the desired additives.

3. Mix the polyethylene from step 1 and the glycol component from step 2.

4. Heat the resulting blend to 110° to 120° C.

5. Maintain this temperature while blending in the extenders, pigments and the like.

It should be noted that although the polyvinyl component and the glycol component are mutually incompatible and the extenders and pigments are generally insoluble in either giving essentially a three-phase system, the blend resulting from step 5 above does not tend to separate once a homogeneous paste is prepared.

The decorating materials of this invention are solid at room temperature (20° C.). They are preferably applied to glass surfaces, principally the exterior of thin-wall glass bottles, using conventional hot screen technique. The glass surface can then be heated to about 160° to 166° C., and a finely divided polyalkylene ionomer powder can be applied by an electrostatic method and cured by heating to 216° to 227° C. The resulting decoration has the same decorative detail as when originally applied, and there has been no interreaction between the decorating material and the ionomer resin. Alternatively, for a vitreous system, a typical formulation would consist of about 18 percent glycol component, 3 to 4 percent polyethylene component and the remainder a colored finely-divided vitrifiable glass extender. Such a formulation would be prepared as described above, applied to a bottle and heated to 550° to 650° C. in accordance with the previously described technique.

We claim:

1. A medium for decorating materials for glass surfaces, said medium consisting essentially of from about 50 to about 97 weight percent polyether glycols which are solid at room temperature and which have a weight average molecular weight in the range of 2000 to 9000, the remainder of said medium being essentially polyvinyl-type polymers which are solid at room temperature, which are incompatible with said glycols when both are in liquid state and which have a viscosity at 140°C. less than 1000 cps.

2. The composition of claim 1 containing 0.5 to 10 weight percent of antioxidants based on the total weight of said composition.

3. The composition of claim 2 wherein said glycols consist essentially of polyethylene glycols and said polyvinyl-type polymers consist essentially of polyethylenes.

4. The composition of claim 3 wherein said glycols are present in an amount of at least 80 weight percent of said medium.

5. A decorating material for glass surfaces consisting essentially of from 20 to 50 weight percent of (A) the composition of claim 1 and from 80 to 50 weight percent of (B) extenders, pigments and dyes.

6. The composition of claim 5 containing 0.1 to 5 weight percent of antioxidants.

7. The composition of claim 6 wherein said glycols consist essentially of polyethylene glycols and said polyvinyl-type polymers consist essentially of polyethylenes.

8. The composition of claim 7 wherein said glycols are present in an amount of at least 80 weight percent of said medium.

9. The composition of claim 8 wherein component (B) consists essentially of inorganic compounds.

* * * * *